United States Patent
Polderman

(10) Patent No.: US 6,537,458 B1
(45) Date of Patent: Mar. 25, 2003

(54) THREE-PHASE SEPARATOR

(75) Inventor: Hugo Gerardus Polderman, The Hague (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/914,929

(22) PCT Filed: Mar. 3, 2000

(86) PCT No.: PCT/EP00/01861

§ 371 (c)(1),
(2), (4) Date: Sep. 5, 2001

(87) PCT Pub. No.: WO00/51707

PCT Pub. Date: Sep. 8, 2000

(30) Foreign Application Priority Data

Mar. 5, 1999 (EP) .............................................. 99301687

(51) Int. Cl.⁷ .............................................. B01D 21/00
(52) U.S. Cl. ...................... 210/801; 210/802; 210/804; 210/188; 210/519; 210/521; 210/539; 95/253; 96/184
(58) Field of Search ................................. 210/801, 802, 210/804, 188, 519, 521, 532.1, 539, 540; 95/253; 96/182, 183, 184

(56) References Cited

U.S. PATENT DOCUMENTS

| | | | |
|---|---|---|---|
| 1,702,612 A | * 2/1929 | Morse | ........................ 210/519 |
| 3,469,373 A | 9/1969 | Lavery et al. | |
| 4,042,512 A | * 8/1977 | McCarthy et al. | .......... 210/519 |
| 4,059,517 A | * 11/1977 | Strahorn et al. | ............ 210/539 |
| 4,208,196 A | 6/1980 | Coggins et al. | |
| 4,359,329 A | * 11/1982 | Willeitner | ............... 210/DIG. 5 |
| 4,539,023 A | 9/1985 | Boley | |
| 4,722,800 A | * 2/1988 | Aymong | ..................... 210/521 |
| 4,778,494 A | 10/1988 | Patterson | |
| 5,068,035 A | * 11/1991 | Mohr | ..................... 210/DIG. 5 |
| 5,415,776 A | * 5/1995 | Homan | ........................ 210/519 |
| 5,520,825 A | * 5/1996 | Rice | ............................ 210/519 |
| 6,214,220 B1 | * 4/2001 | Favret, Jr. | ................... 210/188 |

FOREIGN PATENT DOCUMENTS

| | | | |
|---|---|---|---|
| GB | 1119699 | * 7/1968 | |
| WO | 98/23351 | 6/1998 | ........... B01D/17/00 |

* cited by examiner

Primary Examiner—Christopher Upton

(57) ABSTRACT

A three-phase separator (1) comprising a normally horizontal vessel (3) defining a liquid separation space (5) and a gas space (7), which vessel (3) has an inlet end space (1) provided with a feed inlet (21) and an outlet end space (15) provided with separate outlets (25, 26 and 27) for the three phases, which vessel (3) further comprises an inlet device (31) comprising a primary separator (35) arranged in the gas space (7) and a tilted return tray (38) arranged in the gas space (7) having a lower end (39) that is located near the inlet end wall (13) such that a passage (41) is defined between the lower end (39) and the inlet end wall (13).

14 Claims, 2 Drawing Sheets

THREE-PHASE SEPARATOR

BACKGROUND OF THE INVENTION

The present invention relates to a three-phase separator, wherein a feed comprising a gas phase and a lighter liquid and a heavier liquid phase is separated into the three phases gas, lighter liquid and heavier liquid. Such a separator is also called a gas/liquid/liquid separator. Three-phase separators are used in the oil industry to separate a mixture of hydrocarbons—gas and oil, and water into the constituents gas, oil and water.

Examples of such separators are described in U.S. Pat. No. 3,469,373 and in the book 'Surface Production Operations, Design of Oil-Handling Systems and Facilities', volume 1, 2nd edition, K Arnold and M Stewart, Gulf Publishing Company, 1998 on page 135 and further.

A known three-phase separator comprises a normally horizontal vessel defining a liquid separation space and a gas space above the liquid separation space, which vessel has an inlet end space provided with a feed inlet and an outlet end space provided with separate outlets for the three phases, which vessel further comprises an inlet device in the form of an inlet diverter.

During normal operation a feed comprising a mixture of gas and liquids is introduced through the inlet into the vessel. The feed collides with the inlet diverter, and the sudden change of momentum causes a first separation of gas and liquids. Gas enters the gas space, and the liquids enter the liquid separation space where they are separated in a lighter liquid phase and a heavier liquid phase under the influence of gravity. Gas and the liquid phases are separately removed from the vessel through the outlets. The inlet diverter of the known three-phase separator is a vertical plate that extends into the liquid separation zone. In this way, the diverter forces the liquids to enter the liquid-filled liquid separation space.

A disadvantage of the known separator is a low separation capacity.

It is an object of the present invention to overcome this drawback.

SUMMARY OF THE INVENTION

To this end the three-phase separator according to the present invention comprises a normally horizontal vessel defining a liquid separation space and a gas space above the liquid separation space, which vessel has an inlet end space provided with a feed inlet and an outlet end space provided with separate outlets for the three phases, which vessel further comprises an inlet device comprising a primary separator which is arranged in the gas space and a tilted return tray arranged in the gas space under the primary separator having a lower end that is located near the inlet end wall of the vessel, such that a passage is defined between the lower end and the inlet end wall.

Applicants found that with the separator according to the invention a higher separation capacity can be achieved. Without wanting to be limited in any way by the following theory, applicants believe that the improved capacity is achieved because the liquid is guided to the liquid separation space via the inlet end wall of the separator. Because of this guiding of the liquid flow less turbulence in the liquid phase results as compared to the prior art devices. Because of the decrease in turbulence a more efficient settling of the liquid-liquid phases will result and hence an improved separation efficiency.

BRIEF DESCRIPTION OF THE DRAWINGS

The invention will now be described by way of example in more detail with reference to the accompanying drawings, wherein.

DESCRIPTION OF THE PREFERRED EMBODIMENTS

Figure 1:
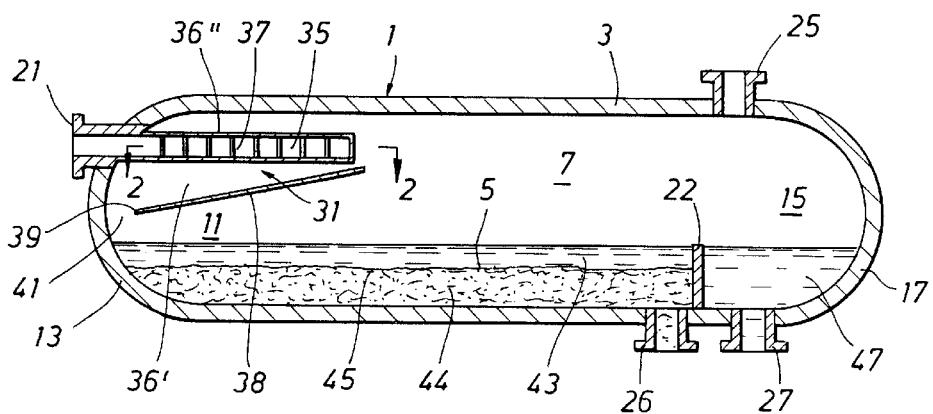
FIG. 1 shows schematically a longitudinal section of the three-phase separator according to the present invention.

Reference is now made to FIG. 1. The three-phase separator 1 according to the present invention comprises a normally horizontal vessel 3. The vessel 3 defines a liquid separation space 5 and a gas space 7 above the liquid separation space 5.

The vessel 3 has an inlet end space 11 having an inlet end wall 13 and an outlet end space 15 having an outlet end wall 17. The inlet end space 11 is provided with a feed inlet 21. The outlet end space 15 is provided with a liquid separation system in the form of a weir 22 that extends over the width of the vessel 3. Furthermore, the outlet end space 15 is provided with separate outlets 25, 26 and 27 for the three phases, gas, heavier liquid and lighter liquid.

The vessel 3 further comprises an inlet device 31, which inlet device 31 comprises a primary separator. The primary separator may be any gas-liquid separator arranged in the gas space 7, which, in use, results in a downwardly discharged liquid flow in said gas space 7. Examples of possible separators are separators comprising a plurality of swirl tubes or a half-open pipe. A further example is a vane pack separator as described in WO-A-9823351. Suitably the primary separator is a vane-type separator, which is arranged in the gas space. The vane-type separator is suitably a so-called Schoepentoeter inlet device 35 as illustrated in FIG. 1. A preferred Schoepentoeter inlet device is exemplified in GB-A-1119699. The preferred Schoepentoeter inlet device 35 comprises an inlet 36 that is in fluid communication with the feed inlet 21. Inlet 36 comprises a number of evenly spaced vertical vanes 37 placed one behind the other between a top plate 36" and a bottom plate 36'. Each vane 37 comprises an outwardly directed deflecting part.

During normal operation a mixture of gas and liquids is supplied to the feed inlet 21. This mixture then flows through the inlet 36 of the Schoepentoeter device 35. The vanes 37, arranged on either side of a flow path in the inlet 36, deflect the mixture outwardly. The change in the direction of flow causes a gas-liquid separation.

The inlet device 31 further comprises a tilted return tray in the form of a tilted guide plate 38, which is arranged in the gas space 7 under the primary separator 35. The tilted guide plate 38 has a lower end 39 that is located near the inlet end wall 13 of the vessel 3 such that a passage 41 is defined between the lower end 39 and the inlet end wall 13. The size of the tilted guide plate 38 is at least equal to the size of the primary separator.

During normal operation, a feed comprising a mixture of gas and liquids is introduced through the inlet 21 into the vessel 3. A first separation is done in the vane-type separator 35: gas enters the gas space 7 from which it is removed through outlet 25, and liquid emerges from the vane-type separator 35 in the direction of the vanes 37 and descends.

The liquid falls on the tilted return tray in the form of guide plate 38 and is guided by the tilted guide plate 38 towards the passage 41. Through that passage the liquid enters the liquid separation space 5. In the liquid separation space 5, the liquid is separated into a lighter liquid phase 43 and a heavier liquid phase 44 under the influence of gravity. The heavier liquid phase 44 settles in the lower part of the liquid separation space 5 and the lighter liquid phase 43 floats on top of the heavier liquid phase 44. The interface between the phases is designated with reference numeral 45.

The outlet end space 15 is provided with the liquid separation system in the form of the weir 22. The lighter liquid flows over the weir 22 to a collecting space 46, from which it is removed through outlet 27. The heavier liquid is removed from the liquid separation space 5 through outlet 26. In this way gas and liquid phases are separately removed from the vessel 3.

In the absence of the tilted guide plate 38, the separated liquid would plunge into the liquid separation space 5, where it would generate turbulence so that mixing between the liquid phases will take place. Such mixing adversely affects the separation performance of the three-phase separator. Moreover the liquid is discharged over the length of the primary separator 35. This leads to a loss of effective separation space. Also gas is entrained in the liquid space. Furthermore, in the gas space vortices are formed, because gas flowing out of the primary separator, and especially out of the vane-type separators 35, is directed downwards by the wall of the vessel 3. These vortices generate vortices in the liquids present in the liquid separation space 5, which causes additional mixing that has an adverse effect on the separation efficiency. The tilted return tray 38, however, reduces both gas-liquid and liquid-liquid mixing because it forms a separation between the gas space 7 and the liquid separation space 5. Furthermore the tilted return tray enlarges the liquid separation space 5, because the liquids are introduced in it through the passage 41 near the inlet end wall 13. The enlarged separation space 5 improves the separation capacity for a given size of the vessel 3.

Figure 2:
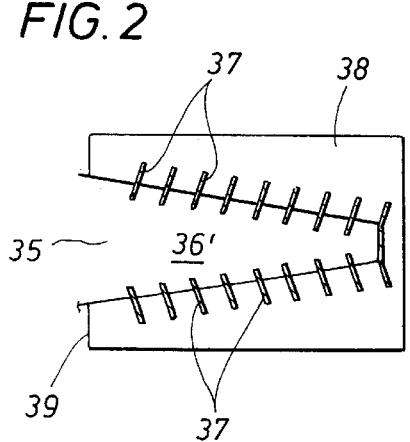
FIG. 2 shows schematically a section along line II—II of the inlet device of FIG. 1.
Figure 3:
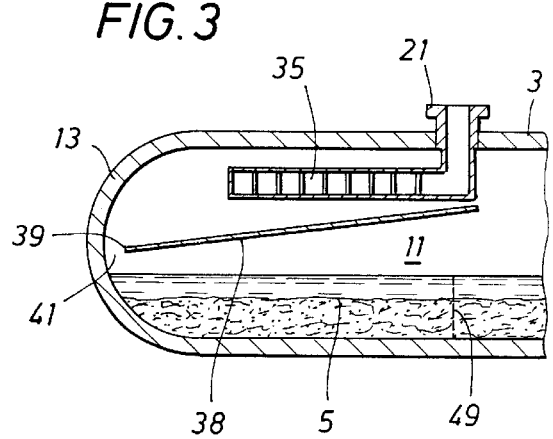
FIG. 3 shows schematically an alternative arrangement of the primary separator.

Reference is now made to FIG. 3 showing schematically a part of a longitudinal section of the three-phase separator of the present invention with an alternative arrangement of the primary separator. In FIG. 3, the elements have been referred to with the reference numerals used in FIGS. 1 and 2. In this embodiment, the primary separator 35 is so directed that, during normal operation, the direction of fluid flow through the primary separator 35 is the same as the direction of the fluids flowing over the tilted guide plate 38.

The three-phase separator may further include a vertical liquid distributor plate 49 (see FIG. 3) arranged in the liquid separation space 5. Such a distribution plate is a plate provided with openings. Because of such a plate a more even distribution of the liquid flow in the liquid space downstream the distributor is achieved. The net free area of such a plate is preferably between 10 and 30%. The diameter of the openings is preferably between 0.005 and 0.025 m.

The tilted return tray should be so designed that it captures at least the majority of the liquid emerging from the primary separator. To achieve this, the return tray can be the tilted guide plate 38, which suitably extends over the width of the vessel 3. This embodiment is particularly suitable when the liquid emerging from the primary separator is evenly distributed over the width of the vessel.

Figure 4:
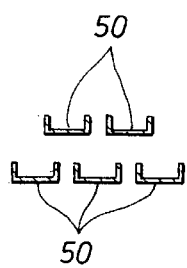
FIG. 4 shows schematically a cross-section of an alternative of the return tray shown in FIG. 1.
Figure 5:
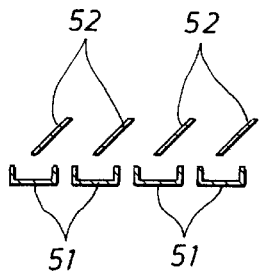
FIG. 5 shows schematically a cross-section of another alternative of the return tray shown in FIG. 1.

Alternatives of the tilted guide plate are shown schematically in FIGS. 4 and 5. FIG. 4 shows a tilted return tray in the form of a plurality of overlapping troughs 50 arranged in a zigzag order. FIG. 5 shows a tilted return tray in the form of a plurality of adjacent troughs 51 and inclined guide plates 52, which direct the liquid to the troughs 51. An advantage of the return trays shown in FIGS. 4 and 5 is that they are open to gas flow so that they do not hamper axial gas flow. The troughs 50 and 51 and the inclined guide plates 52 are tilted in a direction perpendicular to the plane of drawing.

Reference is now made to FIG. 2. Liquid will emerge from the primary separator towards the side of the vessel, and thus the section of the return tray under the primary separator receives hardly any liquid. Thus a return tray that is open to gas flow can as well be obtained by making a longitudinal slit in the return tray under the primary separator. The return tray then comprises two tilted plates arranged at either side of the vessel.

The length of the tilted return tray is suitably equal to the length of the primary separator. The angle of tilt of the tilted return tray is suitable between 5° and 15°.

In the embodiment as discussed with reference to FIG. 1, the liquid separation system is a weir 22 that extends over the width of the vessel 3. However, there are several alternative liquid separation systems possible, for example, the weir 22 can be replaced by a cylinder of the same height that is placed over the outlet 27 for the lighter liquid phase.

Figure 6:
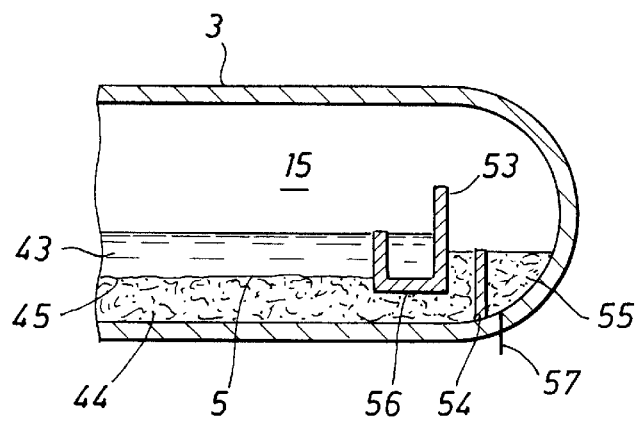
FIG. 6 shows schematically an alternative arrangement of the liquid separation system.

Another alternative is shown in FIG. 6 showing schematically a part of a longitudinal section of the three-phase separator of the present invention with an alternative arrangement of the liquid separation system. In this embodiment the liquid separation system comprises a trough 53 and a weir 54, wherein both the trough 53 and the weir 54 extend over the width of the vessel 3. The walls of the trough 53 are higher than the weir 54 so that during normal operation the lighter liquid phase 43 flows into the trough 53, and the heavier liquid flows over the weir 54 into a collecting space 55. The lighter liquid is withdrawn via outlet conduit 56 and the heavier liquid is withdrawn via outlet conduit 57.

Preferably the liquid space is provided with means to enhance the separation of the liquid phases in the liquid space. Because less disturbance in the liquid space near the inlet end wall is achieved, as explained above, a greater part of the liquid space may be provided with these means to enhance the separation. A preferred separation means is illustrated in FIGS. 7 and 8.

Figure 7:
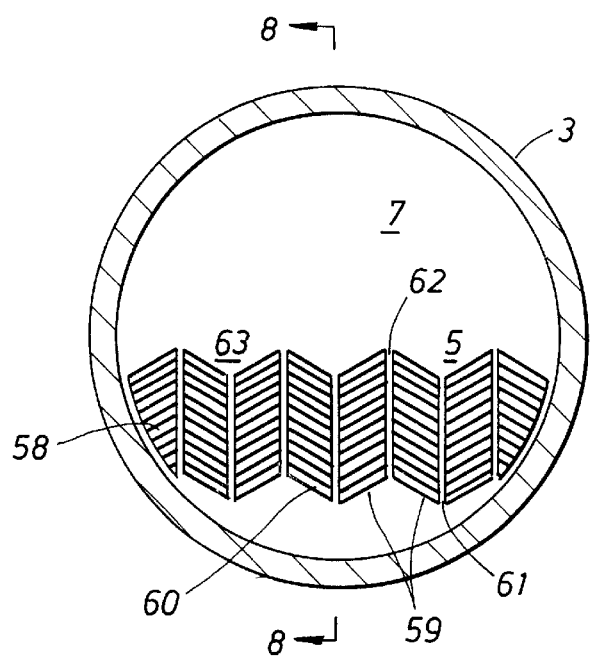
FIG. 7 shows a cross-sectional view AA' of FIG. 8 illustrating separating enhancing means in the liquid space.
Figure 8:
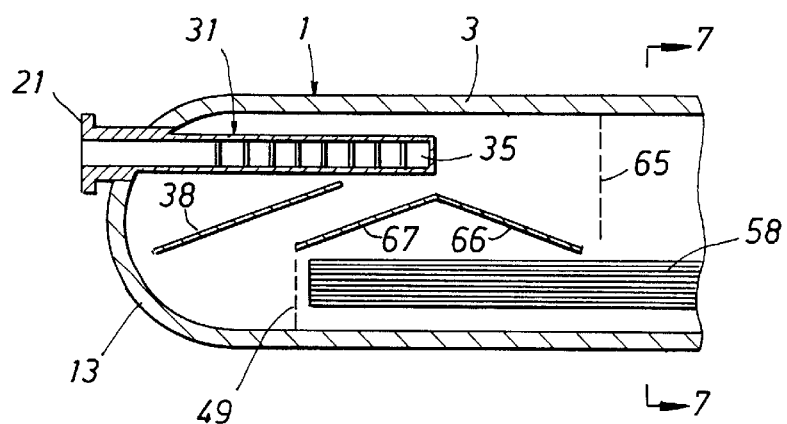
FIG. 8 shows an elongated cross-sectional view BB' of the vessel of FIG. 7.

FIG. 7 illustrates a cross-sectional view AA' of the vessel shown in FIG. 8, which vessel is further provided with separation enhancing means 58. The separating enhancing means 58 comprise at least two stacks 59 of sloping vertically spaced plates 60 and so disposed that on one side of each stack there exists a vertical collecting channel 61 towards which the plates of the stack slope downwardly, and at the opposite side of the same stack there exists a vertical collecting channel 62 towards which both plates of the stack slope upwardly. The space above the stacks provides a collecting chamber 63 for the lighter liquid phase 43 and the space below the stacks provides a collecting chamber 64 for the heavier liquid phase 44. Via vertical collecting channel 62 lighter liquid phase 43 will move upwardly and through vertical collecting channel 61 heavier liquid phase 44 will move downwardly during liquid-liquid separation. Such a separation enhancing means is further exemplified in U.S. Pat. No. 3,563,389.

FIG. 8 shows an elongated cross-sectional view BB' of the vessel of FIG. 7. FIG. 8 also shows a gas distributor plate 65, a liquid distributor plate 49 and a slug tray 66. FIG. 8 shows a preferred embodiment wherein a second tilted return tray 67 is present below vane-type separator 35, arranged parallel to the first tray 38 and such that a second passage is defined at its lower end between the lower end of the first tilted tray and the top end of the liquid distributor plate 49. The gas distributor plate 65 divides a gas space near the inlet end wall and the remaining part of the gas space. The gas distributing plate 65 is suitably a plate provided with openings. The gas distributing plate 65 enhances a more evenly distributed gas flow downstream of the plate 65. The plate 65 further forms a wave breaker when, due to slugging flow a large amount of liquid suddenly enters the three-phase separator 1. Preferably the distance between the inlet device 31 and the gas distributing plate 65 is between 1 and 3 times the diameter of the feed inlet 21. The net free area of such a plate 65 is preferably between 10 and 30%. The diameter of the openings is preferably between 0.005 and 0.025 m.

The three-phase separator is preferably further provided with a slug tray 66 between the tilted return tray 38 or second tilted tray 67, if present, and the gas distributing plate 65. The slug tray 66 is sloped such that the lower end is located near the gas distributing plate 65. This slug tray 66 is so positioned that, when In use, slugs are guided to the liquid separation phase at a position far away from the inlet end wall 13. This results in less disturbance in the liquid phase near the inlet end wall 13. The upper end of the slug tray 66 preferably terminates at the upper end of the tilted guide plate 38 or second tilted tray 67, if present. The lower end of the slug tray 66 preferably terminates just below the normal liquid level of the liquid present liquid separation space 7 and near gas distributing plate 65.

Because liquid distributing plate 49 can be placed nearer to the inlet end wall 13 more space is provided for the separation enhancing means 58 as shown in FIG. 8. The stacks 59 extend preferably from liquid distributor 49 to the liquid separation system, i.e. weir 22. Because more length of the vessel can be used for liquid-liquid separation a further increase of separation capacity results.

What is claimed is:

1. A three-phase separator comprising a normally horizontal vessel defining a liquid separation space and a gas space above the liquid separation space, which vessel has an inlet end space provided with a feed inlet and an outlet end space provided with separate outlets for the three phases, which vessel further comprises an inlet device comprising a primary gas-liquid separator which is arranged in the gas space and a tilted return tray arranged in the gas space under the primary separator having a lower end that is located near the inlet end wall of the vessel, such that a passage is defined between the lower end and the inlet end wall.

2. Three-phase separator according to claim 1, wherein the tilted return tray extends over the width of the vessel.

3. Three-phase separator according to claim 1, wherein the tilted return tray comprises a plurality of overlapping troughs arranged in a zigzag order.

4. Three-phase separator according to claim 1, wherein the tilted return tray comprises a plurality of adjacent troughs and inclined guide plates, which direct during normal operation the liquid to the troughs.

5. Three-phase separator according to claim 1, wherein the tilted return tray comprises two tilted plates arranged at either side of the vessel.

6. Three-phase separator according to claim 1, wherein the length of the tilted return tray is equal to the length of the primary separator.

7. Three-phase separator according to claim 1, wherein the angle of tilt of the tilted return tray is between 5° and 15°.

8. Three-phase separator according to claim 1, wherein the primary separator comprises an inlet fluidly communicating with a feed inlet, which inlet comprises a number of evenly spaced vertical vanes placed one behind the other between a top plate and a bottom plate, which vanes comprise an outwardly directed deflecting part.

9. Three-phase separator according to claim 1, wherein a plate with openings is present in the gas space dividing a gas space near the inlet end wall and the remaining part of the gas space.

10. Three-phase separator according to claim 9, wherein the distance between the inlet device and the plate with openings is between about 1 and 3 times the diameter of the feed inlet which is fluidly connected to the primary separator.

11. Three-phase separator according to claim 10, wherein a slug tray is present in the gas space near the inlet end wall and between the tilted return tray and the plate with openings and wherein the slug tray is sloped such that the lower end is located at the plate with openings.

12. Three-phase separator according to claim 11, wherein in the liquid separation space below the tilted return tray a vertical distribution plate is present dividing a liquid space near the inlet end wall and the remaining part of the liquid separation space.

13. Three-phase separator according to claim 12, wherein the remaining part of the liquid separation space is provided with at least two stacks of sloping vertically spaced plates and so disposed that on one side of each stack there exists a vertical collecting channel towards which the plates of the stack slope downwardly, and at the opposite side of the same stack there exists a vertical collecting channel towards which both plates of the stack slope upwardly.

14. Use of a three-phase separator comprising a normally horizontal vessel defining a liquid separation space and a gas space above the liquid separation space, which vessel has an inlet end space provided with a feed inlet and an outlet end space provided with separate outlets for the three phases, which vessel further comprises an inlet device comprising a primary gas-liquid separator which is arranged in the gas space and a tilted return tray arranged in the gas space under the primary separator having a lower end that is located near the inlet end wall of the vessel, such that a passage is defined between the lower end and the inlet end wall to separate a mixture of gas, oil and water into the constituents gas, oil and water.

\* \* \* \* \*